United States Patent [19]

Hallock

[11] 4,122,752

[45] Oct. 31, 1978

[54] FLAT FASTENER FOR DRIVING INTO METALLIC MATERIAL

[76] Inventor: Robert L. Hallock, 7136 NE. 8th Dr., Boca Raton, Fla. 33432

[21] Appl. No.: 831,443

[22] Filed: Sep. 8, 1977

[51] Int. Cl.² ............................................. F16B 15/00
[52] U.S. Cl. ..................................... 85/30; 151/41.73
[58] Field of Search ................... 85/30, 10 E, 23, 21, 85/10 R; 151/41.73; 10/31, 59

[56] References Cited

U.S. PATENT DOCUMENTS

| | | | |
|---|---|---|---|
| D. 29,283 | 8/1898 | Sweeny | 85/21 X |
| 723,452 | 3/1903 | Estes | 85/30 |
| 1,946,065 | 2/1934 | Dodge | 151/41.73 |
| 2,873,447 | 2/1959 | Catlin et al. | 85/30 X |
| 3,133,579 | 5/1964 | Grimm et al. | 151/41.73 |
| 3,186,284 | 6/1965 | Bennett | 151/41.73 X |
| 4,004,483 | 1/1977 | Hallock | 85/30 X |

FOREIGN PATENT DOCUMENTS

| | | | |
|---|---|---|---|
| 173,100 | 11/1952 | Australia. | |
| 944,243 | 3/1949 | France | 151/41.73 |
| 1,099,241 | 8/1955 | France | 85/10 E |
| 757,560 | 9/1956 | United Kingdom | 151/41.73 |
| 732,203 | 6/1955 | United Kingdom. | |

Primary Examiner—Rodney H. Bonck
Attorney, Agent, or Firm—Dowell & Dowell

[57] ABSTRACT

A fastener apparatus which can be formed by conventional punch press machinery and which is hardened so that the fastener may be driven into metallic structures such as structural steel beams and the like using a conventional hammer or a power operated nailing gun. The apparatus includes a flat body having a penetrating head at one end connected to the body by a reduced neck and such penetrating head is smaller in width than the width of the body. The portion of the body adjacent to the neck is provided with an overlying ledge which forces material into the area adjacent to the neck to form a mechanical lock which resists withdrawal and prevents rotation of the fastener within the material.

3 Claims, 8 Drawing Figures

FLAT FASTENER FOR DRIVING INTO METALLIC MATERIAL

BACKGROUND OF THE INVENTION

1. Field of the Invention

This invention relates generally to fasteners of different kinds and relates particularly to fasteners which can be driven into metallic structures or materials by means of a blow from a manually operated hammer or by a nailing gun.

2. Description of the Prior Art

Heretofore many efforts have been made to provide fasteners for driving into various types of base material with most of the fasteners being applied to relatively soft material such as wood and the like and with some fasteners being applied to metallic materials. In most instances in which the fastener is applied to metallic material, a hole is first provided in the material after which the base material is tapped or provided with threads to receive a machine screw or the like.

Some efforts have been made to provide fasteners which can be driven into metallic structures; however, in most instances these fasteners have required an explosive charge for driving the same and accordingly such fasteners have been relatively expensive to produce and also have been dangerous in use due to flying chips caused by the explosive charge as well as the possibility of premature explosion or firing of the charge before the fastener is in position to penetrate the metallic structure.

Additionally, some efforts have been made to provide a fastener which can be driven into metallic structures by means of a manually operated hammer or the like, such as my previous U.S. Pat. No. 4,004,483; however, these prior art structures have been generally cylindrical and may be provided with screw threads so that it was necessary to make the structures by means of an automatic screw machine or the like. Substantially all of these structures have had a tendency to rotate within the metallic structure after they had been applied, particularly when a torsional force was applied such as by a nut or the like.

Some additional examples of prior art which can be driven into metal are the French Pat. No. 1,099,241, British Pat. Nos. 732,203 and 757,560. Other examples of the prior art which include fasteners having recesses into which material is received to resist withdrawal are shown by the U.S. Pat. No. DE. 29,283 to Sweeney which discloses a nail, and Austrian Pat. No. 173,100 which discloses a push-point having a pair of recesses into which wood or other relatively soft material may be received.

SUMMARY OF THE INVENTION

The present invention is embodied in a flat fastener for driving into metallic material and such fastener includes a relatively flat body which may be generally rectangular in cross-section and having a head at one end which is integrally connected to the body by a reduced neck. Normally the thickness of the body is less than the width so that the cross-sectional configuration of the largest portion of the head is generally square and this permits a ledge or shoulder to be formed at the base portion of the body which extends outwardly of two sides of the penetrating head. The ledge may be generally perpendicular to the direction of driving of the fastener or preferably the ledge is angled downwardly and outwardly slightly to cause material which has been displaced by penetration of the head to be forced into the area adjacent to the reduced neck to form a mechanical lock and thereby resist withdrawal of the fastener from the metallic material. When the fastener is driven, the ledge or shoulder of the body may be slightly embedded in the material; however, even if the body does not penetrate the material, the configuration of the head and neck prevent rotational movement of the fastener after the fastener has been driven into the metallic material. Since the body is substantially flat, the fastener can be manufactured by a conventional punch press or other conventional force applying machinery after which the fasteners are hardened to a hardness greater than the hardness of the material into which the fastener is to be driven.

It is an object of the invention to provide a flat fastener for driving into metallic material and having a body which can be formed in a punch press or the like and having a configuration which prevents rotational movement of the body while resisting withdrawal from the metallic material after the fastener has been driven.

Another object of the invention is to provide a flat fastener having a body with a neck and a penetrating portion at one end and in which the neck and the body of the fastener are substantially planar in one direction and the neck is substantially smaller than the body in another direction and defines a ledge adjacent to the reduced neck portion so that material into which the fastener is driven is forced into the area adjacent to the reduced neck to form a mechanical lock which resists withdrawal of the fastener.

DESCRIPTION OF THE PREFERRED EMBODIMENTS

Figure 1:
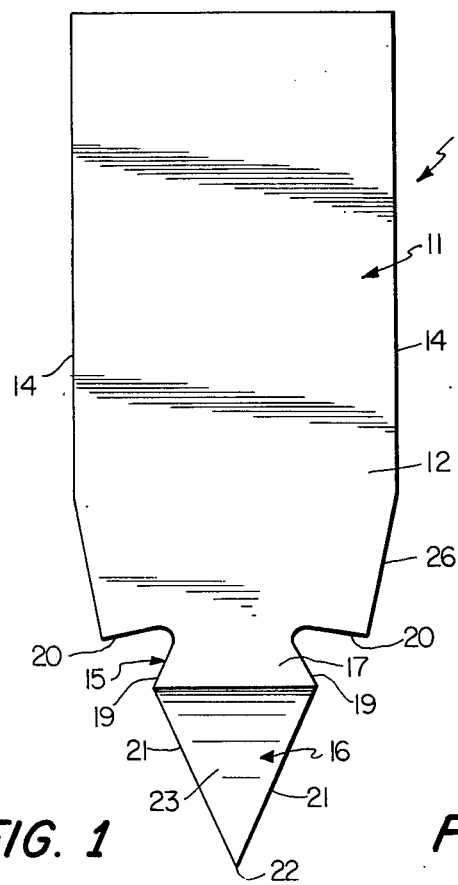
FIG. 1 is a front elevational view of the flat fastener of the present invention.
Figure 2:
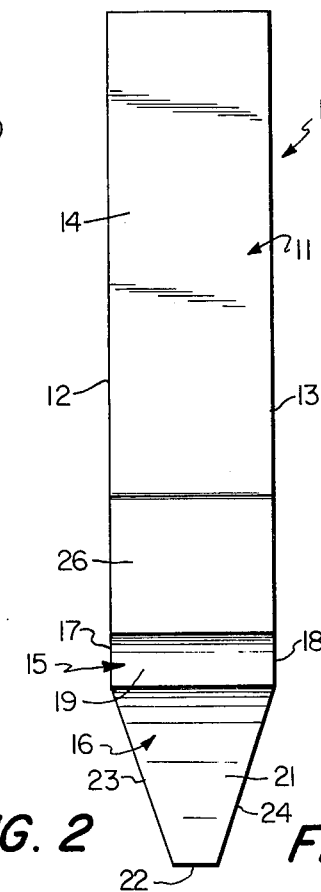
FIG. 2 is a side view thereof.

With continued reference to the drawing, a fastener 10 is provided including a body 11 constructed of any desired material, such as steel or the like which can be heat treated to a desired hardness. Normally, the body 11 is generally rectangular in cross-section and includes generally flat planar front and rear surfaces 12 and 13 and flat side surfaces 14. A reduced neck 15 integrally connects a head or penetrating portion 16 to one end of the body 11. The neck 15 includes front and rear surfaces 17 and 18 which are substantially coplanar with the surfaces 12 and 13 of the body 11 and side surfaces 19 which taper inwardly and upwardly to the point where they join one end of the body 11. The end of the body adjacent to the neck defines a ledge or shoulder 20 on each side.

As illustrated best in FIG. 1, the shoulders 20 at the end of the body 11 taper outwardly and downwardly for a purpose which will be described later. However, it is contemplated that such shoulders could be substantially perpendicular to the longitudinal axis of the body. The upper end of the head 16 is generally square in cross-section and the side surfaces 21 may taper downwardly and inwardly to a line 22, while the front and rear surfaces 23 and 24 taper downwardly and inwardly at an angle less steep than the side surfaces to define a chisel point at the penetrating end of the head.

Figure 4:
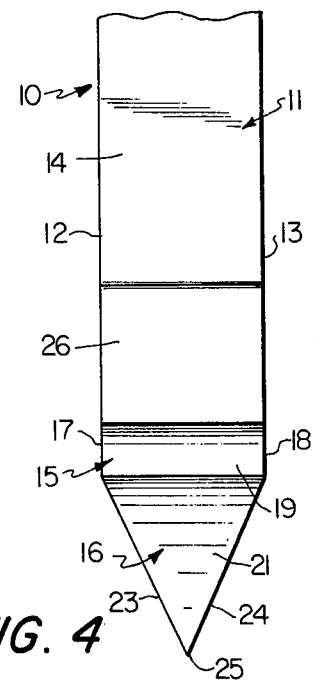
FIG. 4 is a side elevation similar to FIG. 2 of a modified form of the invention.
Figure 3:
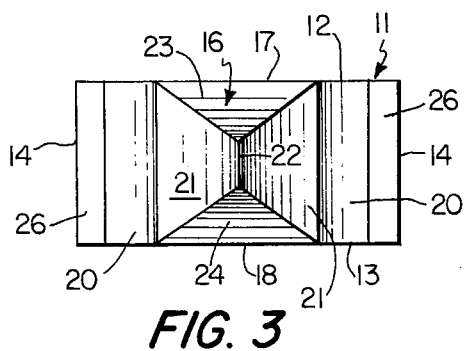
FIG. 3 is an end view showing the penetrating portion.
Figure 5:
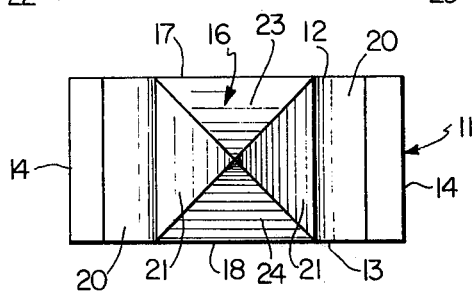
FIG. 5 is an end view of the structure of FIG. 4.

With particular reference to FIGS. 4 and 5, the side surfaces 21 and the front and rear surfaces 23 and 24 taper inwardly and downwardly at the same angle and define a substantially four-sides pyramid terminating at a sharp point 25.

If desired, each of the side surfaces 14 of the body 11 may be provided with a chamfer or downwardly and inwardly tapered portion 26 at the end adjacent to the head 16.

Although the fastener can be of any desired size, a size which has been found satisfactory includes a body having a length of approximately ½ inch (12.700 mm), a width of approximately 0.100 inch (2.540 mm), and a thickness of approximately 0.063 inch (1.588 mm). The neck 15 has a thickness substantially corresponding to the thickness of the body 11 and the smaller width of such neck is approximately 0.053 inch (1.346 mm). The head 16 is substantially square at the large end having a dimension of approximately 0.063 inch (1.588 mm) on each side and such head extends outwardly for a length of approximately 0.070 inch (1.778 mm).

Figure 6:
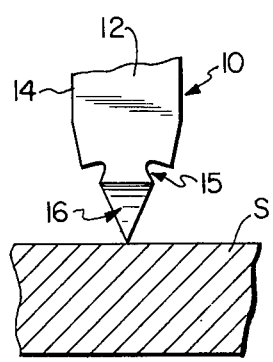
FIG. 6 is a fragmentary front elevation illustrating the fastener as it contacts a metallic base material.
Figure 7:
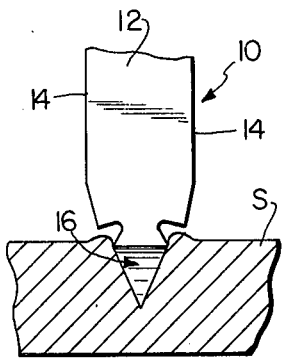
FIG. 7 is a view similar to FIG. 6 showing the fastener partially driven into the metallic material.
Figure 8:
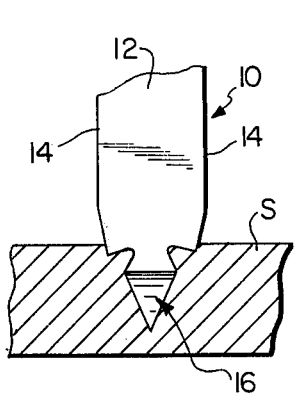
FIG. 8 is a view similar to FIG. 6 showing the fastener completely driven into the metallic material.

With particular reference to FIGS. 6–8, the fastener 10 may be placed in a slot in one end of a hammer (not shown) or a series of fasteners may be supplied to a mechanically or fluid operated nailing gun (not shown). When the fastener is driven into a metallic structure S, such as a steel beam or the like the penetrating point enters the metal and forces portions of the metal to flow outwardly of the penetrating portion, as clearly shown in FIG. 7. Continued axial movement of the fastener causes the shoulders 20 to engage the metal which has been displaced and forces such metal to flow inwardly into the area contiguous to the reduced neck 15. Further axial movement, depending upon the driving force applied to the fastener, causes the end of the body 11 to be embedded in the metallic structure, as illustrated in FIG. 8. The non-circular configuration of the head 16 and neck 15, as well as the end of the body 11, prevent rotation of the fastener within the metallic structure and simultaneously the metal which has been forced into the area adjacent to the reduced neck forms a mechanical lock with the structure and substantially resists withdrawal of the fastener therefrom.

Due to the flat configuration of the fastener, such fastener can be formed on a conventional punch press or other conventional forming mechanism in a minimum of time and with minimum effort and thereafter the fastener preferably is heat treated to a Brinnell hardness greater than the hardness of the metallic structure into which the fastener is to be driven.

I claim:

1. A fastener for driving into metallic material comprising a body of predetermined width and thickness, said body being non-circular in cross-section and of a configuration to be formed by a press, a neck integrally formed at one end of said body and extending longitudinally outwardly therefrom, said one end of said body defining at least one shoulder adjacent to said neck, said neck having a thickness substantially equal to the thickness of said body, a head integrally formed at the other end of said neck, a portion of said head being generally square and having a width which is greater than the width of said neck and less than the width of said body thereby forming at least one recess adjacent to said neck, the width of said neck being at least approximately 85% as wide as said square portion of said head, said square portion of said head having a thickness substantially equal to the thickness of said body and said neck, and said head having inclined surfaces tapering to a penetrating portion, whereby when said fastener is driven into metallic material said head causes the metallic material to flow upwardly and outwardly into engagement with said shoulder and said shoulder forces a portion of such material into the recess adjacent to said neck to lock said fastener to said material.

2. The structure of claim 1 in which said inclined surfaces of said head taper downwardly to a chisel-shaped penetrating portion.

3. The structure of claim 1 in which said inclined surfaces of said head taper downwardly and inwardly to a penetrating point.

* * * * *